(12) United States Patent
Desbiolles et al.

(10) Patent No.: US 6,683,427 B2
(45) Date of Patent: Jan. 27, 2004

(54) DEVICE FOR CONTROLLING AN ELECTRONICALLY COMMUTATED MOTOR

(75) Inventors: Pascal Desbiolles, Thorens-Glieres (FR); Christophe Nicot, Quintal (FR); Achim Friz, Seynod (FR)

(73) Assignee: S.N.R. Roulements, Annecy Cedex (FR)

( * ) Notice: Subject to any disclaimer, the term of this patent is extended or adjusted under 35 U.S.C. 154(b) by 0 days.

(21) Appl. No.: 10/255,039

(22) Filed: Sep. 26, 2002

(65) Prior Publication Data

US 2003/0057903 A1 Mar. 27, 2003

(30) Foreign Application Priority Data

Sep. 26, 2001 (FR) .......................................... 01 12381

(51) Int. Cl.[7] ................................................ H02P 7/06
(52) U.S. Cl. ...................... 318/254; 138/439; 138/721; 138/724
(58) Field of Search ................................ 318/254, 138, 318/439, 721, 724

(56) References Cited

U.S. PATENT DOCUMENTS

| | | | |
|---|---|---|---|
| 4,365,187 A | * 12/1982 | McDaniel et al. | 318/254 |
| 5,431,413 A | 7/1995 | Hajzler | 277/2 |
| 5,590,235 A | * 12/1996 | Rappenecker et al. | 388/803 |
| 5,774,068 A | 6/1998 | Seki | 340/870.31 |
| 5,821,708 A | * 10/1998 | Williams et al. | 318/254 |
| 5,845,045 A | * 12/1998 | Jeske et al. | 388/804 |
| 5,898,301 A | 4/1999 | La Croix et al. | 324/207.22 |
| 5,955,878 A | 9/1999 | Peilloud et al. | 324/165 |
| 6,369,535 B1 | * 4/2002 | Wang et al. | 318/254 |
| 6,400,109 B1 | * 6/2002 | Helmut | 318/439 |

FOREIGN PATENT DOCUMENTS

| | | |
|---|---|---|
| WO | WO 90/07220 | 6/1990 |
| WO | WO 97/47079 | 12/1997 |
| WO | WO 99/17082 | 4/1999 |
| WO | WO 00/62020 | 10/2000 |
| WO | WO 00/75673 A1 | 12/2000 |

* cited by examiner

Primary Examiner—Rita Leykin
(74) Attorney, Agent, or Firm—Arent Fox Kintner Plotkin & Kahn

(57) ABSTRACT

The invention relates to a device for controlling an electronically commutated motor (1) comprising P phases and N pairs of poles (5), said device comprising:

a circular multipole encoder (4) comprising a main multipole track (4a) and a multipole commutation track (4b) comprising 2*P*N singularities (4b1–4b6) equidistributed angularly;

a fixed sensor (6) capable of delivering square digital signals A, B in quadrature and a digital signal C in the form of 2*P*N pulses (TP1–TP6) per revolution of the encoder;

a commutation circuit (7) having 2*P*N switches (T1–T6);

a control circuit (8) for the commutation circuit (7) which:
from the signal c supplies commutation signals for the switches (T1–T6); and
from the signals A, B and according to a first current set point (I*) defines a second current set point (Iref) which controls the current (Im) supplying the phase windings of the motor (1).

18 Claims, 5 Drawing Sheets

DEVICE FOR CONTROLLING AN ELECTRONICALLY COMMUTATED MOTOR

The invention relates to a device for controlling an electronically commutated motor comprising P phases and N pairs of poles, a method for using such a device and an anti-friction bearing integrating the encoder and sensor of such a device.

On account of their high specific power, electronically commutated motors, or brushless motors, can be used to control the rotation of a mechanical member in a large number of applications.

One particular example of such an application is power-assisted steering of motor vehicles by an electric power-assisted steering system.

Within the scope of its application, it is necessary to control precisely the commutation of the current in the phases of these motors in order to obtain a torque which is optimum and equal to a set point with the fewest modulations possible.

To do this, use is known of a sensor comprising three sensing elements disposed opposite an encoder having N pairs of poles, said encoder being rotated by the motor.

In the case of a three-phase motor, by providing that the three sensing elements are phase-displaced with respect to one another by a mechanical angle making it possible to supply three electrical signals phase-displaced by 120 electrical degrees, it is possible to control the commutation between the phases of the motor at the right moment.

But this type of implementation can cause modulations of the motor torque which are due in particular to:
- the reluctance torque of the motor;
- faults of commutation of the current from one phase to another depending on the speed of rotation of the motor;
- the absence of overlapping of the trapezoidal EMFs.

There is known, in particular from the document FR-2 749 452, a device for controlling an electronically commutated electric motor which makes it possible to partially avoid the torque faults related to the commutation of the current from one phase to another.

But, in order to avoid the torque modulation related to the motor design (reluctance torque and absence of overlapping of the trapezoidal EMFs), it then becomes necessary to know to a fine degree the absolute position of the rotor in order to control the current in the phases according to the position of the rotor.

Such a control strategy therefore necessitates an additional sensor giving a high-resolution position in addition to the one controlling the commutation.

This type of solution, in providing two sensors, leads to significant integration constraints and a non-optimised cost. Moreover, it can be penalising in terms of mechanical inertia of the rotor.

The invention aims in particular to resolve these drawbacks by proposing a commutation device comprising a two-track encoder movable rotation-wise and a single sensor fixed rotation-wise which is capable of delivering on the one hand signals for commutating the current in the phases and on the other hand high-resolution position signals allowing the control of the current supplying the phases, with a sufficiently fine resolution to avoid motor torque modulations.

To that end, and according to a first aspect, the invention proposes a device for controlling an electronically commutated motor comprising P phases and N pairs of poles, said device comprising:

- a circular multipole encoder intended to perform, together with the rotor of the motor, a plurality of revolutions around its axis of rotation, said encoder comprising a main multipole track and a multipole commutation track comprising 2*P*N singularities equidistributed angularly, the main and commutation tracks being concentric on the encoder;
- a fixed sensor disposed opposite and at air gap distance from the encoder, comprising at least three sensing elements, at least two of which are positioned opposite the main track so as to deliver two periodic electrical signals S1, S2 in quadrature, and at least one of which is positioned opposite the commutation track so as to deliver an electrical signal S3, the sensor comprising an electronic circuit capable, from the signals S1, S2 and S3, of delivering square digital signals A, B in quadrature and a digital signal C in the form of 2*P*N pulses per revolution of the encoder;
- a circuit for commutating the currents in the phase windings of the motor having 2*P*N switches;
- a control circuit for the commutation circuit which:
  from the signal C supplies commutation signals for the switches; and
  from the signals A, B and according to a first current set point defines a second current set point which controls the current supplying the phase windings of the motor.

According to a second aspect, the invention proposes a method for using such a control device in which the control signals make it possible, according to predetermined commutation logic, to actuate the switches in twos in turn, the transition from the actuation of two switches to the following two taking place each time an electrical pulse of the signal C is detected.

According to a third aspect, the invention proposes an anti-friction bearing intended to allow the rotation of the rotor of an electronically commutated motor comprising P phases and N pairs of poles or that of a member rotated by said rotor, said anti-friction bearing comprising a fixed ring, a rotating ring and rolling bodies disposed between said rings, in which:

- there is associated with the rotating ring a circular multipole encoder comprising a main multipole track and a multipole commutation track comprising 2*P*N singularities equidistributed angularly, the main and commutation tracks being concentric on the encoder; and
- there is associated with the fixed ring a fixed sensor disposed opposite and at air gap distance from the encoder, comprising at least three sensing elements, at least two of which are positioned opposite the main track so as to deliver two periodic electrical signals A, B in quadrature, and at least one of which is positioned opposite the commutation track so as to deliver an electrical signal C in the form of 2*P*N electrical pulses per revolution of the encoder, the signal C being intended to supply commutation signals to the motor and the signals A, B being intended, according to a first current set point, to control the current supplying the motor.

DESCRIPTION OF DRAWINGS

Other objects and advantages of the invention will emerge during the description which follows, given with reference to the accompanying drawings, in which.

The invention relates to a device for controlling an electronically commutated motor 1 or brushless motor comprising P phases.

This type of motor typically comprises a rotor 2 having N pairs of North/South magnetic poles and a stator 3 having P coils B1–B3 formed respectively from a phase winding, the rotor 2 being rotated in a known manner by controlling the electrical supply in the P phase windings.

Figure 1:
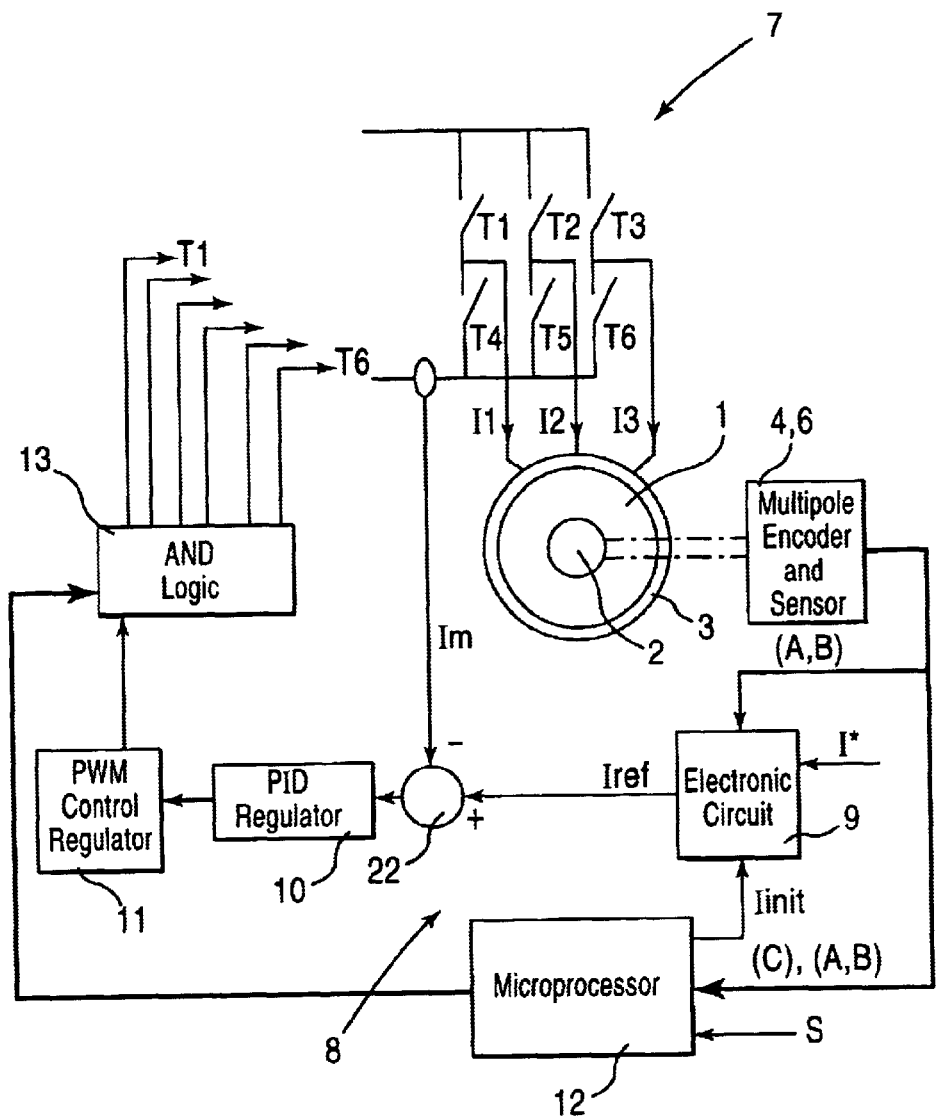
FIG. 1 is a block diagram of a device for controlling an electronically commutated motor comprising 3 phases and one pair of poles.

FIG. 1 depicts a block diagram of a device for controlling such a motor 1 with three phases and one pair of poles.

The device comprises a circular multipole encoder 4 intended to perform, together with the rotor 2, a plurality of revolutions around its axis of rotation.

The encoder 4 comprises a main track 4a and a commutation track 4b comprising 2*P*N singularities 4b1–4b6 equidistributed angularly, the main track 4a and commutation track 4b being disposed concentrically on the encoder 4.

In one particular example, the encoder 4 is formed from a multipole magnetic ring on which there are magnetised a plurality of pairs of equidistributed North and South poles with a constant angular width so as to form the main track 4a and commutation track 4b, a magnetic singularity 4b1–4b6 of the commutation track 4b being formed from two pairs of poles which are different from the others.

Figure 2:
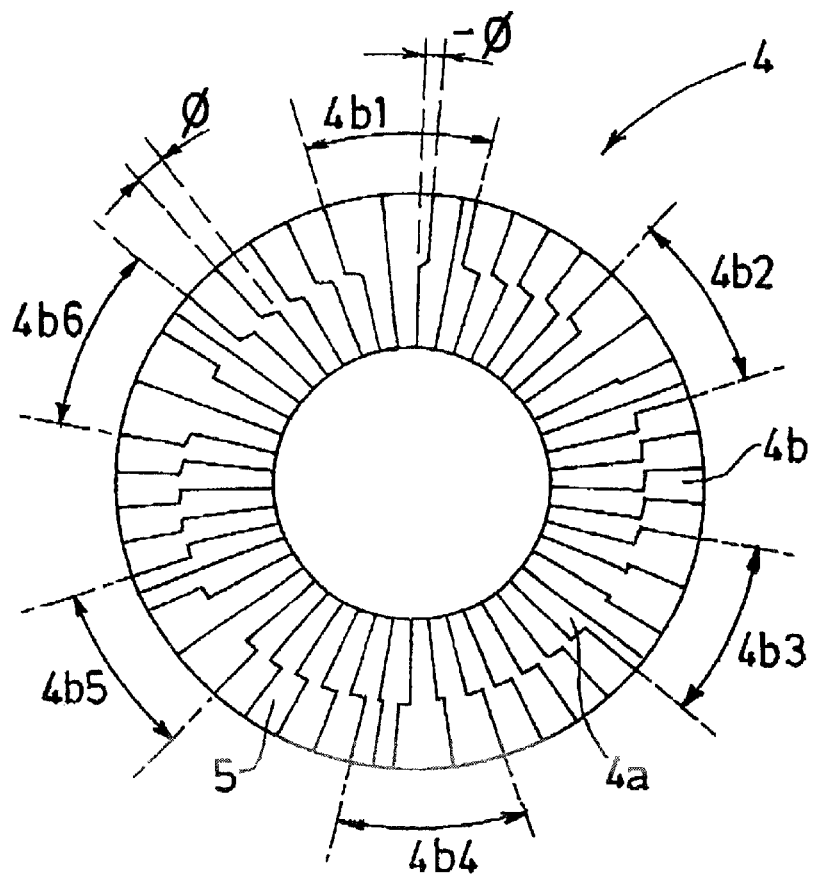
FIG. 2 is a schematic front view of an encoder usable in the control device of FIG. 1.

In the particular embodiment depicted in FIG. 2, the main track 4a, disposed towards the inside of the ring, and commutation track 4b, disposed towards the outside of the ring, comprise 24 pairs of poles. The pairs of poles 5 of the commutation track 4b are in phase advance by a value φ, for example equal to one eighth of a period, compared with those of the main track 4a.

In this case where P=3 and N=1, the commutation track 4b comprises 6 magnetic singularities 4b1–4b6 spaced apart from one another by two pairs of poles. Each singularity is formed from two pairs of poles 5, the width of the poles being arranged so that they are respectively phase displaced by φ, 0, –φ and 0 with respect to the corresponding poles of the main track 4a. Thus, as will be seen subsequently, each pulse of the signal C corresponds to the detection of a phase displacement reversal between the main track 4a and the commutation track 4b.

The control device also comprises a fixed sensor 6 disposed opposite and at air gap distance from the encoder 4.

The sensor 6 comprises at least three sensing elements, at least two of which are positioned opposite the main track 4a, and at least one of which is positioned opposite the commutation track 4b.

In one particular example, the sensing elements are chosen from amongst the group comprising Hall effect sensors, magnetoresistors and giant magnetoresistors.

The sensor 6 used is capable of delivering two periodic electrical signals S1, S2 in quadrature by means of the sensing elements disposed opposite the main track 4a and an electrical signal S3 by means of the sensing elements disposed opposite the commutation track 4b.

The principle of obtaining the signals S1 and S2 from a plurality of aligned sensing elements is for example described in the document FR-2 792 403 originating from the applicant.

But sensors 6 comprising two sensing elements which are capable of delivering the signals S1 and S2 are also known.

Figure 3:
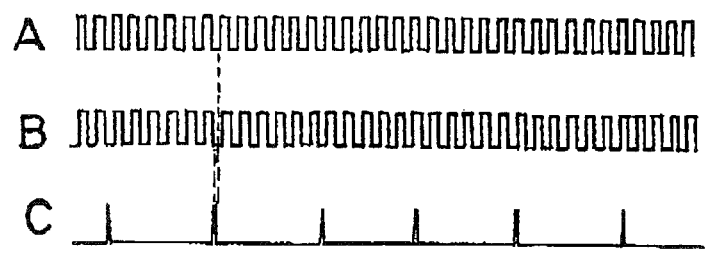
FIG. 3 depicts the signals A, B and C delivered by the sensor during rotation of the encoder depicted in FIG. 2.

The sensor 6 also comprises an electronic circuit which, from the signals S1, S2 and S3, delivers square digital signals A, B in quadrature and digital signal C in the form of 6 (P=3 and N=1) electrical pulses TP1–TP6 per revolution of the encoder 4 (see FIG. 3).

One principle of obtaining the digital signals A, B and C, as well as different embodiments of the magnetic singularities 4b1–4b6, are described in the documents FR-2 769 088 and EP-0 871 014.

By means of an adapted electronic processing of the signals A, B and C, it is possible to obtain to a fine degree the speed of rotation, the angular position and/or the direction of rotation of the encoder 4 with respect to the sensor 6.

According to one implementation, the sensor 6 also comprises an interpolator, for example of the type described in the document FR-2 754 063 originating from the applicant, making it possible to increase the resolution of the output signals.

The sensor 6 can be integrated on a substrate of silicon or equivalent, for example GaAs, so as to form an integrated circuit customised for a specific application, a circuit sometimes designated by the term ASIC for referring to an integrated circuit designed partially or completely according to requirements.

Although the description is given in connection with a magnetic encoder/sensor assembly, it is also possible to implement the invention in an analogous manner using optical technology. For example, the encoder 4 can be formed from a metal or glass target on which the reference and commutation tracks have been etched so as to form an optical pattern analogous to the multipole magnetic pattern described above, the sensing elements then being formed from optical detectors.

The control device also comprises a circuit for commutating 7 the currents in the phase windings of the motor 1.

The commutation circuit 7 comprises 2*P*N switches T1–T6, for example each formed from a MOSFET type field effect transistor operating at 20 kHz, which are disposed as a bridge so as to supply the phase windings appropriately.

The 2*P*N switches T1–T6 can be actuated in twos according to 2*P*N possible states, the transition from one state to another being controlled by the detection of one of the 2*P*N pulses TP1–TP6 of the signal C.

In the embodiment depicted in FIG. 1, the commutation device 7 comprises 6 switches T1–T6 which make it possible to supply the three phase windings with respectively a current I1, I2 and I3, I1+I2+I3 being equal to 0.

The control of the commutation device 7, that is to say the selective actuation of the switches T1–T6, is performed by a control circuit 8 which:

from the signal C supplies commutation signals for the plurality of switches T1–T6; and from the signals A, B and according to a first current set point I* defines a second current set point Iref which controls the current Im supplying the phase windings of the motor 1.

The current set point I* can originate for example from a control loop for the speed of the rotor 2, a control loop for the position of the rotor 2 or a measurement of the torque having to be applied by the rotor 2 on the mechanical member.

The set point I* is supplied to an electronic circuit 9 which, from this set point, introduces a modulation of the set point Iref according to the position of the rotor originating from the signals A and B, this modulation having an amplitude which is a function of I* and being in phase opposition with respect to the intrinsic torque modulation at the motor 1, in order to obtain a useful torque of the motor 1 free from modulation.

In the embodiment depicted, the control circuit 8 comprises a regulation loop comprising a regulator 10, for example of PID (proportional integral derivative) type, a variable width control (PWM) 11 supplying a 20 kHz square signal, the duty factor of which is controlled by the regulator 10, and a comparator 22 comparing Im with Iref originating from the electronic circuit 9.

In a known manner, the regulation loop makes it possible, from Iref, to modulate the current in the phase windings according to the position of the rotor 2 so as to obtain a motor torque constantly equal to the set point I*.

The control circuit 8 can be implemented in the form of a single microprocessor 12 integrating at least one commutation logic for the commutation circuit 7 which determines the sequence of the openings/closings of the different switches T1–T6.

In a variant, the regulation loop can be implemented in analogue form.

According to one implementation, the control circuit 8, by comparing the current Im supplying the motor with the current set point Iref, makes it possible to modulate the commutation signals in terms of width and duration by means of an AND logic function 13.

Thus, each time one of the 2*P*N pulses TP1–TP6 of the signal C is detected, the commutation signals modulated in terms of width and duration selectively control the closing of two switches chosen in the switching logic so as to supply the corresponding two phase windings with the regulated current Im.

The phase commutation instants can be provided upon the detection of the rising or falling edge of the pulse TP1–TP6. In a variant, and in order to improve the accuracy of the commutation, provision can be made that the rising edge is used in one direction of rotation and the falling edge in the other direction.

Figure 4A:
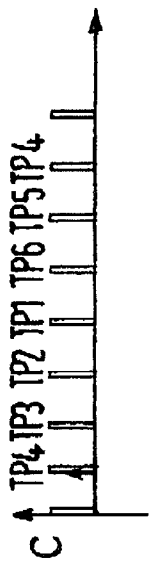
FIGS. 4a and 4b depict a signal C, commutation logic controlled by this signal, the sequencing of the switches, and the current in the corresponding phases, respectively for a rotation in the anticlockwise and clockwise direction of the rotor.
Figure 4A:
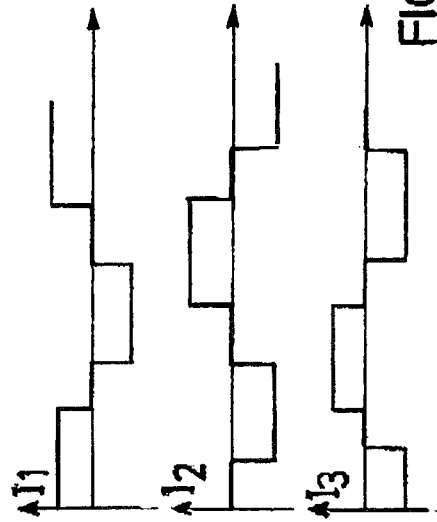
Figure 4B:
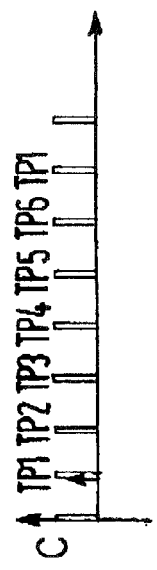
Figure 4B:
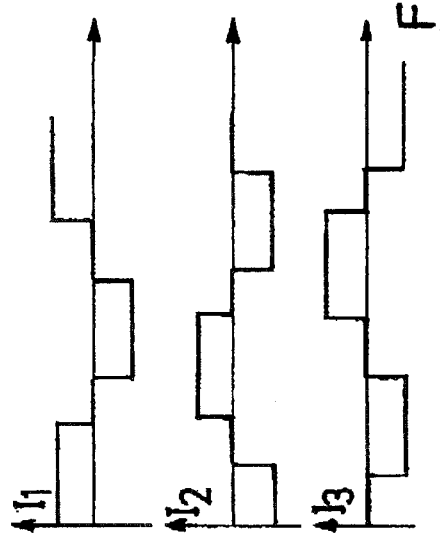

FIGS. 4a and 4b depict, within the scope of the implementation depicted in FIG. 1, a commutation logic for the coils, the sequencing of the switches T1–T6, and the current I1–I3 in the corresponding phases, respectively for an anticlockwise and a clockwise rotation of the rotor 2.

According to this implementation, each time a pulse TP1–TP6 of the signal C is detected, the switches T1 and T5 (I1=−I2, I3=0), T1 and T6 (I1=−I3, I2=0), T2 and T6 (I2=−I3, I1=0), T2 and T4 (I2=−I1, I3=0), T3 and T4 (I3=−I1, I2=0), T3 and T5 (I3=−I2, I1=0), T1 and T5 (I1=−I2, I3=0), etc. are actuated in turn for an anticlockwise rotation.

In the case of a clockwise rotation, the switches T1 and T6 (I1=−I3, I2=0), T1 and T5 (I1=−I2, I3=0), T3 and T5 (I3=−I2, I1=0), T3 and T4 (I3=−I1, I2=0), T2 and T4 (I2=−I1, I3=0), T2 and T6 (I2=−I3, I1=0), T1 and T6 (I1=−I3, I2=0), etc. are actuated in turn.

Figure 5A:
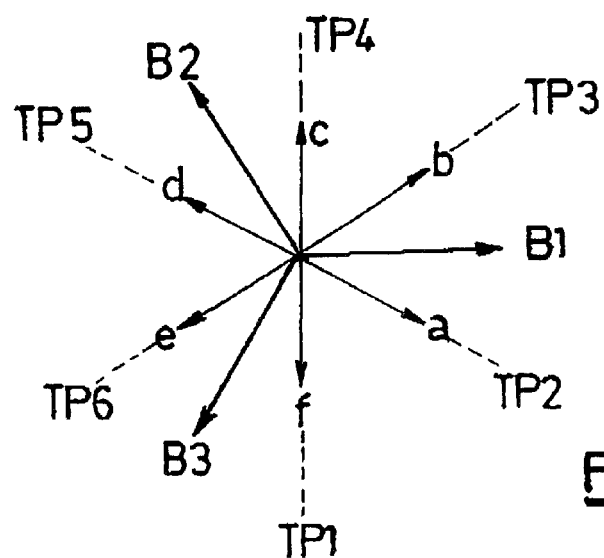
FIG. 5a depicts in vector form the relative positions of the stator field, the rotor field and the pulses for the commutation logic of FIGS. 4a and 4b.
Figure 5B:
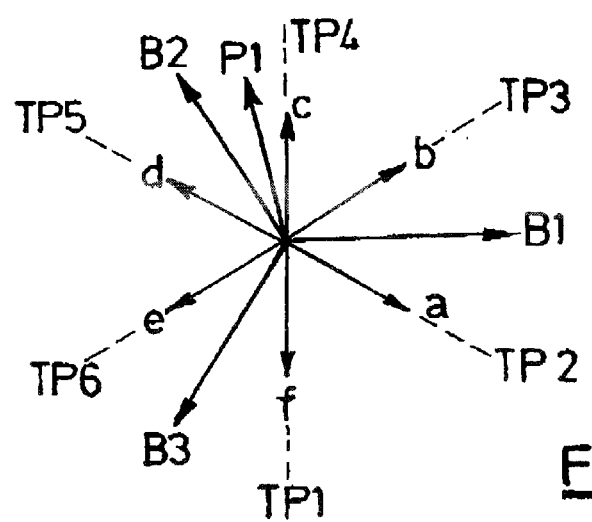
FIGS. 5b and 5c, analogous to FIG. 5a, depict the steps of the procedure for initialising the position of the rotor.
Figure 5C:
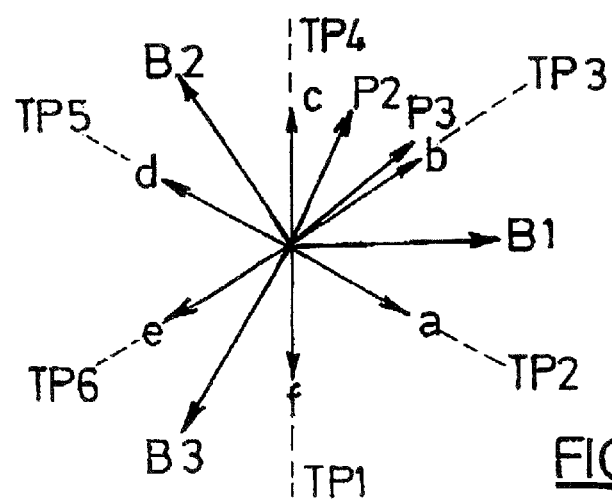

There result therefrom the six positions (a)–(f) of the stator field depicted in FIGS. 5a to 5c and indicated in FIGS. 4a, 4b. These positions are gone through in the order a, b, c, d, e, f, a, etc. for an anticlockwise rotation with a transition from one to another of these positions by the detection respectively of the pulses TP1, TP2, TP3, TP4, TP5, TP6, TP1, etc.

In the case of a clockwise rotation, the positions of the stator field are gone through in the order b, a, f, e, d, c, b, etc. with a transition from one to another of these positions by the detection respectively of the pulses TP4, TP3, TP2, TP1, TP6, TP5, TP4, etc.

The operation of the control device of FIG. 1 is then as follows:

the motor 1 is supplied by a current Im regulated by the regulation loop so as to allow the rotor 2, and therefore the associated encoder 4, to be rotated;

the sensor 6 delivers the signals A, B representing in particular the position of the rotor 2 and the signal C in the form of 6 pulses TP1–TP6 per revolution;

each time a pulse TP1–TP6 is detected, the microprocessor 12 selectively closes two switches T1–T6 according to the selected commutation logic;

the signals A, B, representing in particular the position of the rotor 2, make it possible, according to the first current set point I* and by means of the control circuit 8, to control the current Im supplying the motor 1 so as to limit the modulations thereof.

In one particular example (FIGS. 4a, 4b, 5a–5c), the commutation logic is implemented so that the rotor field is phase displaced from the stator field by an angle between 60° and 120° so as to optimise the torque supplied by the motor 1.

Where the encoder 4 is not indexed perfectly with respect to the rotor, that is to say the position of the pulses does not correspond to the ideal commutation positions depicted in FIGS. 5a–5c, it is possible, at the line output and on a dedicated bench, to store the phase displacement which exists between the position of the pulses TP1–TP6 and those desired for the commutations.

To that end, the signals A, B representing the position of the rotor are used to measure the phase displacement between the transition to zero of the back electromotive forces of the motor 1 and the transition of the reference pulses TP1–TP6.

This phase displacement value can be stored in an EEPROM or Flash type memory of the control circuit a so as to allow, by retiming, the detection of the pulses TP1–TP6 at the desired commutation positions.

A description is given below of a method for using a control device also comprising means, for example integrated in the control device 8, of initialising the position of the rotor 2 allowing the commutation signals to be adapted to the direction of rotation desired for the rotor 2.

Upon powering up of the device, this method comprises a procedure of initialising the position of the rotor 2 which comprises the steps of first selecting commutation logic making the stator field rotate in one direction.

Then, the control circuit 8 is operated according to the first state of this logic in order to actuate two switches T1–T6 for a given time interval in order to supply two phases of the motor with a current limit sufficient to rotate the rotor 2.

The time interval can be typically 30 msec and the current Iinit must be chosen, for example by simulation, in order to allow, according to the application under consideration, the rotation of the rotor 2. The time interval can be optimised according to the inertia of the system.

Thus, three scenarios can occur, either the rotor 2 does not rotate, or the rotor 2 rotates in the same direction as the stator field, or the rotor 2 rotates in the opposite direction to the stator field.

The scenario is determined by analysis in the control circuit 8 of the signals A, B.

The first two cases do not allow the position of the rotor 2 to be initialised since either the initialisation current Iinit has no effect (stator and rotor fields in phase opposition) or the rotor and stator fields do not intersect while the states of the commutation logic are being run through.

Thus, if the rotor 2 does not rotate, a transition is made to the second state of the commutation logic until a rotation of the rotor 2 is detected.

And, if the rotor 2 rotates in the same direction as the stator field, the commutation logic is changed, that is to say the stator field is made to rotate in the other direction.

When the rotor 2 rotates in the opposite direction to the stator field, the states of the commutation logic are run through until a reversal of the direction of rotation of the rotor 2 is detected.

Upon this reversal of the direction of rotation of the rotor 2, there is a transition to the state n−2 of the commutation logic in order to detect a new reversal of the direction of rotation of the rotor 2.

In the example depicted in the figures, the rotor field is initially in the position P1 (see FIG. 5*b*) and the commutation logic induces an anticlockwise rotation of the stator field. The first state of this commutation logic places the stator field at (a) which causes the rotation of the rotor 2 in the clockwise direction under the action of the torque induced by the angle formed between the rotor and stator fields.

Then, the second state of the commutation logic (position b) induces a rotation of the rotor 2 in the same direction to the position P2 (see FIG. 5*c*).

The third state of the commutation logic induces the stator field (c) which is in phase advance with respect to the position P2 which leads to a reversal of the direction of rotation of the rotor 2.

Next, the state n−2, that is to say the position (a), is applied for the stator field so as to make the rotor 2 rotate again in the clockwise direction and the pulse TP3 is detected.

From these steps, the relative position P3 of the rotor 2 with respect to the pulse TP3 is deduced, it being possible for this determination to be made reliable by reiterating the first (a) and third (c) states of the commutation logic so as to make the rotor 2 oscillate around the position (b).

Initialisation of the position of the rotor 2 makes it possible, during operation of the control device, to select the commutation logic according to the direction of rotation desired for the rotor 2, said direction 8 being injected into the control circuit 8.

This is because, in the example depicted in FIG. 5*c*, the information on the position of the rotor 2 can be stored in the control circuit 8 by knowing that, considering the position P3 of the rotor with respect to TP3:

for an anticlockwise rotation, the stator 3 is supplied so as to obtain the stator field d and then the sequencing e, f, a, b, c, etc. is performed each time a new pulse TP1–TP6 is detected;

for a clockwise rotation, the stator 3 is supplied so as to obtain the stator field (a), the detection of TP3 induces the transition from (a) to (f) and then the sequencing e, d, c, b, a, etc. is performed each time a new pulse TP1–TP6 is detected.

Thus, this procedure makes it possible to select the commutation logic according to the direction of rotation desired for the rotor 2 while keeping an optimum phase displacement between the stator and rotor fields.

Figure 6:
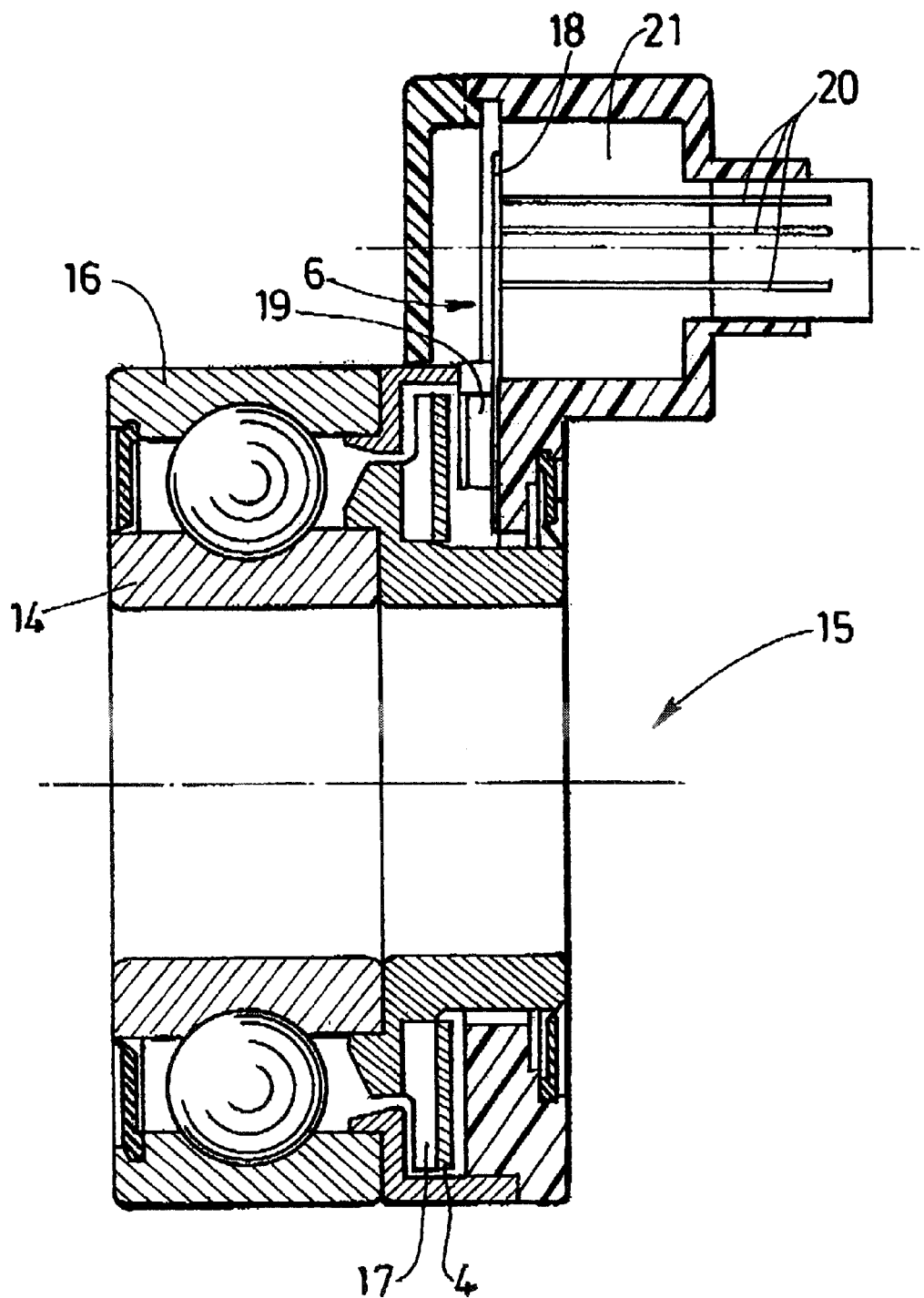
FIG. 6 is a view in longitudinal cross-section of an anti-friction bearing according to the invention.

According to one implementation depicted in FIG. 6, the encoder 4 is associated with the rotating ring 14 of an anti-friction bearing 15 and the sensor 6 is associated with the fixed ring 16 of said anti-friction bearing.

Thus, the invention proposes an anti-friction bearing 15 integrating the encoder 4 and the sensor 6 of the control device, said anti-friction bearing being capable of providing the rotation of the rotor 2 or that of a member rotated by the rotor 2.

The encoder 4 can be associated with the rotating ring 14 by means of an annular frame 17 on which the encoder 4 is overmoulded.

FIG. 6 depicts one embodiment of the association of the sensor 6 on the fixed outer ring 16 of the anti-friction bearing 15. The sensor 6 is associated with a support 18, for example of PCB type, carrying on the one hand the ASIC 19 and on the other hand the input/output connectors 20 of the sensor 6. The ASIC 19 is positioned so that the sensing elements are opposite and at air gap distance from the tracks of the encoder 4. Furthermore, the input/output connectors 20 are positioned in a housing 21 extending radially to the anti-friction bearing 15.

Other implementations of the association of an encoder 4 and a sensor 6 on an anti-friction bearing 15 can be envisaged, in particular those described in the documents FR-2 794 504 and FR-2 700 588 originating from the applicant.

In a variant, provision can be made that the sensor 6 is separate from the fixed ring 16 of the anti-friction bearing 15 while providing the positioning of the sensing elements opposite and at air gap distance from the tracks of the encoder 4.

What is claimed is:

1. A device for controlling an electronically commutated motor (1) comprising P phases and N pairs of poles, said device comprising:

a circular multipole encoder (4) intended to perform, together with the rotor (2) of the motor (1), a plurality of revolutions around its axis of rotation, said encoder (4) comprising a main multipole track (4*a*) and a multipole commutation track (4*b*) comprising 2*P*N singularities (4*b*1–4*b*6) equidistributed angularly, the main (4*a*) and commutation (4*b*) tracks being concentric on the encoder (4);

a fixed sensor (6) disposed opposite and at air gap distance from the encoder (4), comprising at least three sensing elements, at least two of which are positioned opposite the main track (4*a*) so as to deliver two periodic electrical signals S1, S2 in quadrature, and at least one of which is positioned opposite the commutation track (4*b*) so as to deliver an electrical signal S3, the sensor (6) comprising an electronic circuit capable, from the signals S1, S2 and S3, of delivering square digital signals A, B in quadrature and a digital signal C in the form of 2*P*N pulses (TP1–TP6) per revolution of the encoder;

a circuit for commutating (7) the currents in the phase windings of the motor (1) having 2*P*N switches (T1–T6);

a control circuit (8) for the commutation circuit (7) which:
from the signal C supplies commutation signals for the switches (T1–T6); and
from the signals A, B and according to a first current set point (I*) defines a second current set point (Iref) which controls the current (Im) supplying the phase windings of the motor (1).

2. A control device according to claim 1, characterised in that the control circuit (8) comprises a regulation loop controlled by the second current set point (Iref) originating from an electronic circuit (9), said control circuit (8) being capable of modulating the commutation signals in terms of width and duration by means of an AND logic function (13).

3. A control device according to claim 1, characterised in that the control circuit (8) comprises a microprocessor (12) integrating at least one commutation logic for the commutation circuit (7).

4. A control device according to any one of claims 1 to 3, characterised in that the encoder (4) is formed from a multipole magnetic ring on which there are magnetised a plurality of pairs of equidistributed North and South poles (5) with a constant angular width so as to form the main track (4a) and commutation track (4b), a magnetic singularity (4b1–4b6) being formed from two pairs of poles which are different from the others.

5. A control device according to claim 4, characterised in that the sensing elements are chosen from amongst the group comprising Hall effect sensors, magnetoresistors and giant magnetoresistors.

6. A control device according to any one of claims 1 to 3, characterised in that the encoder (4) is formed from a target on which the reference (4a) and commutation (4b) tracks have been etched so as to form an optical pattern analogous to a multipole magnetic pattern, the sensing elements then being formed from optical detectors.

7. A control device according to claim 5, characterised in that the sensor (6) comprises a plurality of aligned sensing elements which are disposed opposite and at air gap distance from the main track (4a).

8. A control device according to claim 1, characterised in that the sensor (6) comprises an interpolator increasing the resolution of the output signals.

9. A control device according to claim 1, characterised in that the sensor (6) is integrated in an ASIC type circuit (19).

10. A control device according to claim 1 characterised in that the encoder (4) is associated with the rotating ring (14) of an anti-friction bearing (15) allowing the rotation of the rotor (2) or that of a member rotated by the rotor (2).

11. A control device according to claim 10, characterised in that the sensor (6) is associated with the fixed ring (16) of the anti-friction bearing (15).

12. A control device according to claim 10, characterised in that the sensor (6) is separate from the fixed ring (16) of the anti-friction bearing (15).

13. A control device according to claim 1 characterised in that the control circuit (8) comprises means of initialising the position of the rotor (2) allowing the commutation signals to be adapted to the direction of rotation desired for the rotor (2).

14. A method for using a control device according to claim 1 in which the control signals make it possible, according to predetermined commutation logic, to actuate the switches (T1–T6) in twos in turn, the transition from the actuation of two switches (T1–T6) to the following two taking place each time an electrical pulse (TP1–TP6) of the signal C is detected.

15. A method according to claim 14, characterised in that it comprises a preliminary step of indexing the encoder (4) in which the phase displacement is stored in an EEPROM or Flash type memory of the control circuit (8).

16. A method according to claim 14 or 15 when it depends on claim 13, characterised in that, upon powering up of the device, a procedure of initialising the position of the rotor (2) is performed, said procedure comprising the steps of:

a) selecting commutation logic making the stator field rotate in one direction;

b) operating the control circuit (8) according to a first state of this logic in order to actuate two switches (T1–T6) for a given time interval in order to supply two phases of the motor (1) with a current (Iinit) sufficient to rotate the rotor (2);

c) detecting, by analysis of the signals A, B, the direction of rotation of the rotor (2) under the action of this current (Iinit);

d) if the rotor (2) does not rotate, making a transition to the second state of the commutation logic and then reiterate the preceding steps;

e) if the rotor (2) rotates in the same direction as the stator field, changing the commutation logic and then reiterate the preceding steps;

f) when the rotor (2) rotates in the opposite direction to the stator field, reiterating steps b) and c) with the successive states of the commutation logic until there is a reversal of the direction of rotation of the rotor (2);

g) upon the reversal of the direction of rotation of the rotor (2), making a transition to the state n−2 of the commutation logic in order to detect a new reversal of the direction of rotation of the rotor (2);

h) detecting the position of the pulse (TP1–TP6) of the signal C recorded during step g) so as to obtain the relative position of the rotor (2) with respect to this pulse;

said method making it possible, according to the direction of rotation desired for the rotor (2), to select the corresponding commutation logic.

17. An anti-friction bearing (15) intended to provide the rotation of the rotor (2) of an electronically commutated motor (1) comprising P phases and N pairs of poles (5) or that of a member rotated by said rotor (2), said anti-friction bearing (15) comprising a fixed ring (16), a rotating ring (14) and rolling bodies disposed between said rings (16, 14), in which:

there is associated with the rotating ring (14) a circular multipole encoder (4) comprising a main multipole track (4a) and a multipole commutation track (4b) comprising 2*P*N singularities (4b1–4b6) equidistributed angularly, the main (4a) and commutation (4b) tracks being concentric on the encoder (4); and there is associated with the fixed race (16) a fixed sensor (6) disposed opposite and at air gap distance from the encoder (4), comprising at least three sensing elements, at least two of which are positioned opposite the main track (4a) so as to deliver two square digital signals A, B in quadrature, and at least one of which is positioned opposite the commutation track (4b) so as to deliver a signal C in the form of 2*P*N pulses (TP1–TP6) per revolution of the encoder (4), the signal C being intended to supply commutation signals to the motor (1) and the signals A, B being intended, according to a current set point (I*), to control the current (Im) supplying the motor (1).

18. A control device according to claim 6, characterised in that the sensor (6) comprises a plurality of aligned sensing elements which are disposed opposite and at air gap distance from the main track (4a).

* * * * *